United States Patent Office 2,822,262
Patented Feb. 4, 1958

2,822,262

SEPARATION OF NICKEL FROM COBALT

Robert Lucien Benoit, Wei Cheng Lin, and Vladimir Nicolaus Mackiw, Fort Saskatchewan, Alberta, Canada, assignors to Sherritt Gordon Mines Limited, Toronto, Ontario, Canada, a company of Ontario, Canada No Drawing. Application April 11, 1956
Serial No. 577,446

6 Claims. (Cl. 75—109)

This invention relates to the separation of values of nickel from an aqueous solution which contains dissolved salts of nickel and cobalt. The invention is particularly directed to the separation of small amounts of nickel from a cobalt containing solution to permit the recovery therefrom of cobalt substantially free from nickel.

Nickel and cobalt metals are similar in many physical and chemical characteristics. Values of both metals usually occur in natural mineral deposits and, usually, they cannot be separated by conventional ore dressing processes. Thus, when values of both nickel and cobalt are present in metal bearing material, they tend to remain together in the products derived from the several hydrometallurgical and/or pyrometallurgical processes to which the metal bearing material is subjected for the extraction and recovery of the respective metals.

It is now known that nickel contained in nickel-cobalt bearing material can be extracted and recovered substantially free from impurities by hydrometallurgical methods. For example, nickel which contains less than about 0.5% cobalt can be recovered by such methods from metal bearing material which contains values of both nickel and cobalt.

However, it has been very difficult, if not impossible to produce from nickel-cobalt bearing material on a commercial scale by known methods, a cobalt product which contains less than from about 1.0% to about 1.5% nickel. For example, it has been found in recently developed hydrometallurgical methods that an ammoniated solution containing dissolved salts of nickel and cobalt can be reacted at elevated temperature and pressure with a reducing gas, such as carbon monoxide or hydrogen, of which hydrogen is preferred, in the presence of a catalyst, to produce nickel metal powder substantially free from impurities. That is, in such a reducing reaction nickel is first precipitated as metal powder. As reduction proceeds and the nickel content of the solution is progressively reduced, cobalt commences to precipitate and its precipitation continues in progressively increasing amounts as the nickel content is progressively reduced.

The nickel content of the solution can be reduced, however, to about equal concentrations of nickel and cobalt without appreciable co-precipitation of cobalt, that is, to a ratio of nickel to cobalt of about 1:1. It is not possible, however, to precipitate nickel from solutions which contain cobalt to nickel ratios greater than about 5:1 without concurrent precipitation of appreciable amounts of cobalt. When the cobalt to nickel ratio is greater than about 5:1, either a low grade nickel product metal powder contaminated by cobalt or a low grade cobalt metal powder contaminated by nickel is obtained as reduction proceeds.

Thus, while the problem of precipitating nickel by gas reduction substantially free from impurities has been largely overcome, there remains the important problem of recovering cobalt by gas reduction substantially free from impurities from solutions which contain dissolved values of both cobalt and nickel.

The method of the present invention is, of course, based on actual results obtained in extensive investigations conducted over a long period of time and is independent of theoretical considerations. A reasonable explanation of the problem of separating nickel from a solution which contains both nickel and cobalt is that there is no particular difficulty in reducing the nickel content of the solution to a cobalt to nickel ratio of about 100:1, separating precipitated nickel values from the solution, and then precipitating by gas reduction cobalt values from the residual solution as cobalt metal powder which contains from about 1% to about 1.5% nickel. While such cobalt metal is suitable for certain purposes, it is not satisfactory for purposes which require high purity cobalt, that is cobalt which contains less than 1% to as low as 0.05% nickel or less. It has been found, also, that while the cobalt to nickel ratio of the solution can be increased to 150:1 to 1000:1 or higher by continued gas reduction, precipitated nickel values tend to redissolve in the solution after termination of the reduction until the cobalt to nickel ratio is returned to about 100:1. Thus, while the nickel content can be precipitated substantially completely from such a solution by gas reduction, there remains the problem of preventing redissolution of precipitated nickel values during the period they remain in contact with the solution at the termination of the reducing operation.

We have found that this problem can be overcome by a relatively simple, easily executed method.

The solution subjected to treatment by the method of the present invention contains dissolved salts of cobalt and nickel, usually in the form of sulphates or chloride. The solution may be acid, basic or neutral depending on its origin and the nature of the treatment or treatments to which it has been subjected in preparation for its treatment by this method. Also, it is contemplated that the solution will have been derived by an earlier treatment or sequence of treatments during which the cobalt-nickel values will have been dissolved in the solution. Also, if larger amounts of nickel originally were present in the solution, it is anticipated that the solution will have been treated by known methods, such as by gas reduction, to recover as much as possible of the dissolved nickel as a product metal. Thus, for economic reasons, it is anticipated that the solution treated by the present method will have a cobalt to nickel ratio of from about 5:1 to about 100:1.

The method of the present invention for separating nickel from cobalt comprises, in general, the steps of adding cobalt powder to the cobalt-nickel containing solution. Ammonia is added and the solution is reacted at elevated temperature and pressure with a sulphur free reducing gas, such as carbon monoxide or hydrogen, preferably hydrogen. Nickel precipitates from the solution together with some cobalt depending on the amount of added ammonia. The metal particles are separated from the cobalt bearing solution. The cobalt bearing solution can then be treated for the precipitation and recovery of cobalt. The metal particles can be withdrawn from the circuit after each use or, alternatively they may be reused in the following reductions until their usefulness is impaired, at which time they can be withdrawn from the circuit. The metal coating formed during reduction can be removed by leaching the particles, such as with sulphuric or hydrochloric acid, and the re-activated cobalt particles returned to the nickel stripping circuit while the solution so formed can be recycled. Thus, the method of the present invention can be conducted without loss of metal values.

The method of the present invention can be employed to separate nickel from cobalt containing solutions without concurrent precipitation of appreciable amounts of cobalt. Thus, there is no upper limit on the amount of nickel which may be present in the solution subjected to this treatment. However, it is anticipated that operating economics will suggest the recovery from the original solution of as much nickel as can be recovered as a marketable product prior to treatment of the residual solution by the present method which then will be conducted as a nickel stripping operation. Thus, it is anticipated that the starting solution will contain from about 5.0 to about 0.5 grams of nickel or less per litre of solution in order to restrict the amount of cobalt seed required and the amount of metal re-circulated.

The solution is adjusted to an ammonia content of from about 2 to about 10 mols of ammonia per mol of nickel depending upon the amount of nickel in the solution. That is, if the nickel content is low, of the order of about 0.5 gram per litre, a high ammonia to nickel molar ratio of the order of about 10:1 is employed and this molar ratio is reduced as the nickel content is increased to a minimum of about 2:1. This ammonia adjustment is made either by heating the solution to reduce the free ammonia content in the case of strongly ammoniacal solutions or by the addition of ammonia, preferably as aqueous ammonia, to a solution which contains less than the required amount.

Cobalt powder is added to the cobalt-nickel solution. The amount added is dependent on the fineness of the powder and on the amount of nickel present in the solution. The finer the cobalt powder, the less is required. For example, for a specific amount of nickel in the solution, about 10 to 20 grams per litre of powder of 1 micron size is sufficient whereas at least 100 grams per litre of 50 micron size is required. Also, as the nickel content of the solution is increased, the amount of cobalt powder must be increased.

After adjustment of the ammonia content of the solution and the addition of cobalt powder, the solution is ready for the precipitation of dissolved nickel values by gas reduction.

Reduction is conducted at a temperature within the range of from about 250° to 400° F. preferably from 300° to 350° F. and under a partial pressure of a reducing gas, such as carbon monoxide or hydrogen, preferably hydrogen, within the range of from about 200 to 1000 pounds per square inch, preferably about 350 pounds per square inch. The nickel stripping operation is improved by the presence of from about 75 to about 300, preferably from 80 to 150 grams per litre of ammonium sulphate in the solution during reduction.

The nickel precipitation step can be conducted with the addition of different amounts of ammonia depending on the number of reduction cycles it is desired to obtain from the seed before it becomes ineffective for further use and the amount of nickel it is desired to precipitate from the solution. Each method of operating has advantages and disadvantages which must be considered. For example, when the cobalt powder is employed in an acid solution or without the addition of ammonia, there is no appreciable precipitation of cobalt but the powder can be used in only one cycle.

As the ammonia addition is increased, larger amounts of cobalt are co-precipitated from the solution, but the cobalt particles can be used for more cycles and higher cobalt to nickel ratios can be obtained. For example, the cobalt particles can be used in from about 6 to 10 cycles and cobalt to nickel ratios as high as from 1000:1 to 3000:1 can be obtained. A cobalt to nickel ratio in the residual solution of 3000:1 permits the recovery of cobalt therefrom which contains only 0.033% nickel. Thus, the selection of the conditions under which the stripping operation is conducted depends on the degree of the nickel separation desired and other factors which affect the overall economics of the method.

Nickel and some cobalt are deposited on the cobalt particles during the nickel stripping operation. Whether the cobalt particles have been employed in one stripping cycle or in several cycles, the newly deposited metal can be separated from the cobalt by leaching the particles with about 3% sulphuric acid solution at about 120° C. for about one-half hour. Nickel and some cobalt are dissolved in this leaching operation leaving the cobalt particles ready for re-use. The nickel and cobalt leach solution can be recycled.

The following examples illustrate the operation of the process.

*Example 1*

The solution contained 0.89 gram per litre nickel and 21 grams per litre cobalt, 150 grams per litre ammonium sulphate, 1.5 grams per litre ammonia and 20 grams per liter cobalt powder about 1.18 microns in size. Reduction was conducted at 350° F. and under a partial pressure of hydrogen of 350 pounds per square inch. The metal particles were used for another similar treatment.

| Time, Minutes | First Treatment | | Second Treatment | |
|---|---|---|---|---|
| | Ni, g. p. l. | Co, g. p. l. | Ni, g. p. l. | Co, g. p. l. |
| 0 | 0.89 | 21 | 0.89 | 21.2 |
| 15 | 0.28 | 22.2 | 0.60 | 20.9 |
| 30 | 0.19 | 21.8 | 0.19 | 20.5 |
| 45 | 0.16 | 21.9 | 0.16 | 20.5 |
| 60 | 0.09 | 22.2 | 0.13 | 20.9 |
| 75 | 0.03 | 21.8 | 0.102 | 21.2 |
| | Co:Ni ratio 420:1 | | Co:Ni ratio 200:1 | |

*Example 2*

This example illustrates the results obtained in operating the nickel stripping method under acid conditions. The solution contained 20 g. p. l. ammonium sulphate and 15 g. p. l. cobalt particles 1.18 microns in size. Sufficient sulphuric acid was added to the solution to produce a pH value of 4. Reduction was conducted at 350° F. and 350 pounds per square inch partial pressure of hydrogen.

| Time, Mins. | Ni, g. p. l. | Co, g. p. l. | Co/Ni Ratio | Time, Mins. | Ni, g. p. l. | Co, g. p. l. | Co/Ni Ratio |
|---|---|---|---|---|---|---|---|
| 0 | 0.48 | 26.4 | 55:1 | 0 | 0.54 | 23.6 | 44:1 |
| 5 | 0.144 | 26.4 | 183:1 | 15 | 0.26 | 24.5 | 94:1 |
| 10 | 0.120 | 26.4 | 220:1 | 30 | 0.23 | 23.0 | 100:1 |
| 25 | 0.075 | 26.4 | 352:1 | 45 | 0.19 | 23.0 | 121:1 |
| 40 | 0.060 | 26.4 | 440:1 | 60 | 0.21 | 23.6 | 113:1 |
| 55 | 0.057 | 26.8 | 475:1 | 75 | 0.23 | 23.6 | 102:1 |
| 70 | 0.041 | 26.8 | 660:1 | 90 | 0.19 | 22.6 | 119:1 |
| 85 | 0.033 | 26.4 | 680:1 | Discharge | 0.16 | 22.6 | 141:1 |
| Discharge | 0.092 | 24.0 | 262:1 | | | | |

Example 3

These examples illustrate the results obtained by stripping nickel from a neutral solution. The conditions of operation were the same as in Example 2 above with the difference that the pH of the solution was 7.

A

| Time, minutes | Ni, g. p. l. | Co, g. p. l. | Co/Ni Ratio |
|---|---|---|---|
| 0 | 0.73 | 25.0 | 34 |
| 15 | 0.096 | 24.9 | 260 |
| 30 | 0.056 | 24.9 | 445 |
| 45 | 0.022 | 24.0 | 1,090 |
| 60 | 0.0163 | 23.6 | 1,450 |
| 75 | 0.0137 | 23.0 | 1,680 |
| 90 | 0.0094 | 23.0 | 2,450 |
| 105 | 0.0068 | 22.6 | 3,330 |

B

| Time | Ni, g. p. l. | Co, g. p. l. | Co/Ni Ratio |
|---|---|---|---|
| 0 | 0.71 | 23.6 | 33 |
| 15 | 0.05 | 22.6 | 454 |
| 30 | 0.05 | 22.6 | 454 |
| 45 | 0.04 | 22.2 | 554 |
| 60 | 0.03 | 22.2 | 740 |
| 75 | 0.025 | 22.8 | 925 |
| 90 | 0.0198 | 22.2 | 1,125 |

C

| Time | Ni, g. p. l. | Co, g. p. l. | Co/Ni Ratio |
|---|---|---|---|
| 0 | 0.70 | 27.4 | 39 |
| 15 | 0.195 | 26.8 | 138 |
| 30 | 0.162 | 26.8 | 165 |
| 45 | 0.137 | 25.9 | 188 |
| 60 | 0.128 | 26.4 | 206 |
| 75 | 0.125 | 25.9 | 207 |
| 90 | 0.117 | 25.9 | 222 |
| 105 | 0.118 | 26.4 | 223 |

Product: 38 g. cobalt particles containing 8.4% Ni.

Example 4

These examples illustrate the results obtained by stripping nickel from a solution having a pH about 8.5 produced by adding about 5 mols of ammonia per mol of nickel. Conditions of operation were the same as Example 2 above.

A

| Time, minutes | Ni, g. p. l. | Co, g. p. l. | Co/Ni Ratio |
|---|---|---|---|
| 0 | 0.75 | 28.0 | 37 |
| 15 | 0.015 | 24.0 | 1,600 |
| 30 | 0.0081 | 24.0 | 2,980 |
| 45 | 0.0043 | 24.4 | 5,670 |
| 60 | 0.0060 | 23.8 | 3,990 |
| 75 | 0.0068 | 23.0 | 3,380 |
| 90 | 0.0073 | 23.6 | 3,230 |

B

| Time | Ni, g. p. l. | Co, g. p. l. | Co/Ni Ratio |
|---|---|---|---|
| 0 | 0.75 | 28.0 | 37 |
| 15 | 0.0205 | 28.0 | 1,360 |
| 30 | 0.0167 | 28.4 | 1,700 |
| 45 | 0.015 | 25.4 | 1,700 |
| 60 | 0.0098 | 26.8 | 2,730 |
| 75 | 0.0107 | 26.8 | 2,510 |
| 90 | 0.0093 | 24.9 | 2,680 |

C

| Time | Ni, g. p. l. | Co, g. p. l. | Co/Ni Ratio |
|---|---|---|---|
| 0 | 0.71 | 27.0 | 39 |
| 15 | 0.101 | 26.8 | 265 |
| 30 | 0.0198 | 25.2 | 1,260 |
| 45 | 0.012 | 24.9 | 2,070 |
| 60 | 0.0086 | 25.4 | 2,950 |
| 75 | 0.0103 | 24.9 | 2,400 |
| 90 | 0.0082 | 24.5 | 2,980 |

D

| Time | Ni, g. p. l. | Co, g. p. l. | Co/Ni Ratio |
|---|---|---|---|
| 0 | 0.72 | 27.4 | 38 |
| 15 | 0.48 | 26.4 | 179 |
| 30 | 0.056 | 26.2 | 458 |
| 45 | 0.035 | 24.5 | 700 |
| 60 | 0.017 | 24.5 | 1,440 |
| 75 | 0.0154 | 24.9 | 1,610 |
| 90 | 0.0188 | 24.5 | 1,310 |

E

| Time | Ni, g. p. l. | Co, g. p. l. | Co/Ni Ratio |
|---|---|---|---|
| 0 | 0.72 | 25.9 | 36 |
| 15 | 0.29 | 24.5 | 85 |
| 30 | 0.25 | 26.8 | 106 |
| 45 | 0.225 | 26.8 | 119 |
| 60 | 0.22 | 25.9 | 117 |
| 75 | 0.159 | 25.4 | 160 |
| 90 | 0.163 | 27.4 | 168 |
| 105 | 0.174 | 27.4 | 157 |
| 120 | 0.183 | 27.4 | 150 |

Product: 45 g. cobalt particles containing 12.6% Ni.

Example 5

These examples illustrate the results obtained by stripping nickel from a solution having a pH about 10 produced by adding about 10 mols ammonia per mol of nickel. The conditions of operation were the same as Example 2 above.

A

| Time, minutes | Ni, g. p. l. | Co, g. p. l. | Co/Ni Ratio |
|---|---|---|---|
| 0 | 0.58 | 26.0 | 45 |
| 15 | 0.0138 | 19.0 | 1,370 |
| 30 | 0.0077 | 19.0 | 2,470 |
| 45 | 0.0156 | 19.0 | 1,220 |
| 60 | 0.019 | 19.0 | 1,000 |

B

| Time | Ni, g. p. l. | Co, g. p. l. | Co/Ni Ratio |
|---|---|---|---|
| 0 | 0.59 | 26.0 | 44 |
| 5 | 0.009 | 25.0 | 2,780 |
| 15 | 0.0086 | 19.9 | 2,320 |
| 30 | 0.0052 | 19.3 | 3,720 |
| 45 | 0.0060 | 19.0 | 3,170 |
| 60 | 0.0065 | 19.0 | 2,930 |
| 75 | 0.0099 | 19.0 | 1,920 |

C

| Time | Ni, g. p. l. | Co, g. p. l. | Co/Ni Ratio |
|---|---|---|---|
| 0 | 0.57 | 24.0 | 42 |
| 15 | .0207 | 22.2 | 1,070 |
| 30 | .0073 | 19.0 | 2,600 |
| 45 | .0061 | 18.7 | 3,070 |
| 60 | .0056 | 18.4 | 3,290 |
| 75 | .0078 | 18.4 | 2,370 |

D

| Time | Ni, g. p. l. | Co, g. p. l. | Co/Ni Ratio |
|---|---|---|---|
| 0 | 0.57 | 38.0 | 67 |
| 5 | .07 | 38.0 | 545 |
| 15 | .018 | 36.0 | 2,000 |
| 30 | .0042 | 22.6 | 5,400 |
| 45 | .0077 | 18.9 | 2,470 |
| 60 | .0107 | 18.9 | 1,770 |
| 75 | .1010 | 18.9 | 1,870 |
| 90 | .0138 | 18.9 | 1,370 |

E

| Time | Ni, g. p. l. | Co, g. p. l. | Co/Ni Ratio |
|---|---|---|---|
| 0 | .59 | 31.0 | 53 |
| 5 | .144 | 35.0 | 244 |
| 10 | .08 | 29.2 | 362 |
| 25 | .033 | 29.2 | 880 |
| 40 | .012 | 28.0 | 2,340 |
| 55 | .0112 | 21.5 | 1,920 |
| 70 | .0060 | 20.2 | 3,370 |
| 85 | .0039 | 20.2 | 5,150 |
| 100 | .0064 | 19.9 | 3,130 |

F

| Time, minutes | Ni, g. p. l. | Co, g. p. l. | Co/Ni Ratio |
|---|---|---|---|
| 0 | .58 | 32.2 | 56 |
| 5 | .158 | 28.6 | 181 |
| 10 | .105 | 28.0 | 267 |
| 25 | .023 | 23.1 | 1,005 |
| 40 | .006 | 23.1 | 3,830 |
| 55 | .0056 | 20.7 | 3,700 |
| 70 | .0056 | 19.9 | 3,570 |
| 85 | .0051 | 19.1 | 3,750 |
| 100 | .0094 | 19.1 | 2,040 |

G

| Time | Ni, g. p. l. | Co, g. p. l. | Co/Ni Ratio |
|---|---|---|---|
| 0 | .60 | 24.0 | 40 |
| 5 | .173 | 23.1 | 134 |
| 10 | .072 | 24.9 | 347 |
| 25 | .025 | 22.2 | 890 |
| 40 | .0101 | 21.2 | 2,090 |
| 55 | .0096 | 19.9 | 2,070 |
| 70 | .0049 | 19.1 | 3,900 |
| 85 | .0070 | 18.6 | 2,680 |
| 100 | .0075 | 18.6 | 2,470 |
| 115 | .0075 | 18.6 | 2,470 |

H

| Time | Ni, g. p. l. | Co, g. p. l. | Co/Ni Ratio |
|---|---|---|---|
| dissolved in beaker 200° F | .63 | 25.0 | 40 |
| autoclave 350° F.-0 | .42 | 21.8 | 52 |
| 5 | .036 | 20.5 | 570 |
| 10 | .0082 | 20.5 | 2,500 |
| 25 | .0069 | 19.9 | 2,870 |
| 40 | .0060 | 19.9 | 3,320 |
| 55 | .0116 | 19.9 | 1,720 |
| 70 | .0107 | 19.9 | 1,860 |
| 85 | .0158 | 19.9 | 1,260 |
| 100 | .0172 | 19.9 | 1,160 |

I

| Time | Ni, g. p. l. | Co, g. p. l. | Co/Ni Ratio |
|---|---|---|---|
| 0 | .58 | 26.8 | 46 |
| 5 | .102 | 17.4 | 170 |
| 15 | .070 | 17.7 | 254 |
| 30 | .047 | 19.6 | 417 |
| 45 | .037 | 20.5 | 552 |
| 60 | .019 | 20.5 | 1,080 |
| 75 | .017 | 22.2 | 1,300 |
| 90 | .025 | 25.0 | 1,000 |
| 105 | .0206 | 27.4 | 1,330 |
| 120 | .022 | 28.8 | 1,310 |

J

| Time | Ni, g. p. l. | Co, g. p. l. | Co/Ni Ratio |
|---|---|---|---|
| 0 | .59 | 34.0 | 57 |
| 15 | .086 | 34.0 | 395 |
| 30 | .092 | 25.0 | 272 |
| 45 | .057 | 25.0 | 440 |
| 60 | .0355 | 24.0 | 675 |
| 75 | .035 | 21.5 | 615 |
| 90 | .0108 | 20.9 | 1,940 |
| after cooling | .0060 | 19.3 | 3,220 |

Product: 190 g. cobalt particles with 8.2% Ni.

Example 6

The following example illustrates the results obtained by stripping nickel from a solution which contained 5.65 g. p. l. nickel as $NiSO_4 \cdot 7H_2O$. The solution contained about 96 g. p. l. $CoSO_4 \cdot 7H_2O$; 150 g. p. l. $(NH_4)_2SO_4$. Reduction was conducted at 350° F., a hydrogen partial pressure of 350 pounds per square inch; and an ammonia to nickel molar ratio of 5:1.

| Time, minutes | Ni, g. p. l. | Co, g. p. l. | Co/Ni Ratio |
|---|---|---|---|
| 0 | 5.56 | 23.6 | 4 |
| 5 | 5.1 | 25.9 | 5 |
| 10 | 0.40 | 19.0 | 48 |
| 15 | 0.126 | 19.3 | 152 |
| 30 | 0.094 | 18.7 | 200 |
| 45 | 0.090 | 18.7 | 208 |
| 60 | 0.060 | 18.7 | 312 |
| 75 | 0.032 | 18.2 | 570 |
| 90 | 0.069 | 18.4 | 257 |
| 105 | 0.096 | 18.4 | 192 |
| 120 | 0.122 | 18.4 | 151 |
| 135 | 0.148 | 18.4 | 124 |
| | 0.148 | 18.4 | 124 |

The method of the present invention possesses a number of important advantages.

Nickel can be stripped from a solution which contains dissolved salts of nickel and cobalt to a cobalt to nickel ratio of as high as 3000:1 without concurrent precipitation from the solution of appreciable amounts of cobalt. The cobalt particles dispersed in the solution function as a catalyst to initiate and promote the reduction to the extent that the stripping operation is conducted rapidly under reasonable temperature and pressure conditions. Cobalt particles used in the method can be obtained from the cobalt product derived from the following treatment of the cobalt bearing solution in which the dissolved cobalt values are precipitated as cobalt metal powder. Also, the stripping operation is conducted without loss of metal values from the overall metals recovery circuit.

It will be understood, of course, that modifications can be made in the preferred embodiment of the method described herein without departing from the scope of the invention as defined by the appended claims.

What we claim as new and desire to protect by Letters Patent of the United States is:

1. In a method of precipitating nickel values from an ammoniated solution containing dissolved salts of nickel and cobalt in the ratio of cobalt to nickel less than 100:1 by reacting the solution with a sulphur free reducing gas at elevated temperature and pressure, the improvement which comprises adjusting the ammonia content of the solution to at least about 2 mols of ammonia per mol of nickel, conducting the reducing reaction in the presence of added finely divided cobalt metal particles, and continuing the reaction to precipitate nickel on said cobalt metal particles until a cobalt to nickel ratio in the solution greater than 100:1 is attained, and separating nickel-cobalt metal particles from the solution leaving a residual solution in which the cobalt to nickel ratio is greater than 100:1.

2. In a method of precipitating nickel values from an ammoniated solution having a pH value within the range of from about pH 7 to about pH 3.5 and containing dissolved salts of nickel and cobalt in the ratio of cobalt to nickel less than 100:1 by reacting the solution at a temperature above about 250° F. with hydrogen under a partial pressure greater than 200 pounds per square inch, the improvement which comprises adjusting the ammonia content of the solution to at least about 2 mols of ammonia per mol of nickel, conducting the reducing reaction in the presence of added finely divided cobalt metal particles, and continuing the reaction to precipitate nickel on said cobalt metal particles until a cobalt to nickel ratio in the solution greater than 100:1 is attained, and separating nickel-cobalt metal particles from the solution leaving a residual solution in which the cobalt to nickel ratio is greater than 100:1.

3. In a method of separating nickel values according to claim 1 in which metal coated cobalt particles separated from the solution are employed in a following nickel stripping operation.

4. In a method of separating nickel values according to claim 2 in which metal coated cobalt particles separated from the solution are employed in a following nickel stripping operation.

5. In a method of separating nickel values from a solution having a pH value about 7 and containing, in solution, nickel and cobalt values and at least about 2 mols ammonia per mol of nickel, the improvement which comprises adding finely divided cobalt particles to the solution, reacting the solution at a temperature above about 250° F. with hydrogen under a partial pressure greater than 200 pounds per square inch, continuing the reducing reaction to produce a cobalt to nickel ratio in the solution greater than 100:1 and separating metal coated cobalt particles from the solution leaving a residual solution in which the cobalt to nickel ratio is greater than 100:1.

6. In a method of separating nickel values according to claim 5 in which metal coated cobalt particles separated from the solution are employed in a following nickel stripping operation.

References Cited in the file of this patent

UNITED STATES PATENTS

| | | |
|---|---|---|
| 2,690,391 | Falck-Muus | Sept. 28, 1954 |
| 2,735,760 | Allen et al. | Feb. 21, 1956 |
| 2,753,257 | Nashner et al. | July 3, 1956 |